Figure 1:
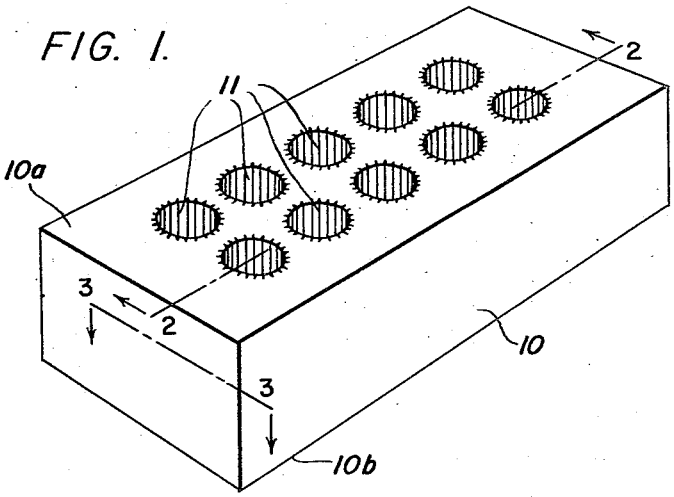

Oct. 22, 1957  V. A. BARNHART  2,810,286
CORED MASONRY BRICK
Filed Oct. 26, 1953

Inventor:
VERN A. BARNHART,
Attorneys.

United States Patent Office 2,810,286
Patented Oct. 22, 1957

2,810,286

CORED MASONRY BRICK

Vern A. Barnhart, Athens, Ohio

Application October 26, 1953, Serial No. 388,078

4 Claims. (Cl. 72—41)

This invention relates to building bricks, as ordinarily made from clays of various kinds, shale, glass, or other material, for laying with mortar in the construction of masonry buildings and other structures, and relates particularly to such bricks as provided with a plurality of core passages extending between and opening into opposed principal mortar-bonding faces thereof.

It is the objective of most brick manufacturers to produce a brick which is as dense as possible, so that it will absorb little or no moisture. Otherwise, the freezing and thawing encountered in most climates where brick is used as a building material will tend to disintegrate the brick following its incorporation in a masonry structure. Also, most porous bricks possess an excessive moisture absorption rate, which tends to suck the mortar dry before proper bonding can take place.

Nevertheless, it is desirable that there be some capacity in a brick to take up excess moisture from a mortar immediately upon laying in order to prevent weeping and bleeding of the mortar, as well as any tendency for the brick to float upon the mortar.

While it is impossible in some instances to attain the density desired for a brick, due largely to the grade of raw material available, most bricks of good quality have very limited capacity to absorb moisture, in fact, not sufficient capacity to prevent the undesirable conditions mentioned above, when laid.

Heretofore, attempts have been made to solve the problems involved by careful control of the character of the mortar, which is difficult and by no means always satisfactory. While so-called "moisture retentive" mortars are available commercially, they cannot compensate adequately for fundamental deficiencies in the brick.

In the instance of poor quality, very porous bricks, soaking in water is resorted to prior to laying. This is obviously undesirable, as well as time consuming, and, in effect, renders them more difficult to lay and otherwise less desirable from all standpoints than denser bricks with limited capacity for moisture absorption.

Regardless of the above considerations, it is common practice to provide building brick with a plurality of core passages extending between and opening into the opposed, principal mortar-bonding faces, in order to achieve a more advantageous tie-in with the mortar and to derive certain advantages in manufacture which are only incidental to the present discussion. These core passages are ordinarily defined by smooth and impervious, skin-tight surfaces produced by the forming die.

In my earlier filed and presently copending application for patent, Serial No. 698,283, now Patent No. 2,660,878, I have disclosed and claimed a cored building brick, wherein the core-defining surfaces are scarified longitudinally in alternate rough ridges and furrows, which intersect and open into opposite mortar bonding faces of the brick to facilitate the flow thereinto and retention thereby of mortar exudate. The rough character of such ridges and furrows provides for impaling the mortar exudate, while the skin-broken, porous surfaces enables the body of the brick to absorb more of the excess liquid from the mortar than would otherwise occur, this being particularly true considering the mortar impaled and held contiguous to the porous core-defining surfaces.

In one sense, the present invention represents an improvement on this prior development. In another sense, however, it represents an entirely new concept.

Thus, the significant feature of the present invention is the provision of a multiplicity of furrows in the interior, core-defining surfaces of the brick, such furrows being of capillary character. It makes little difference whether such surfaces be rough or not, so far as the essence of the present invention is concerned, nor does it matter whether such surfaces be skin-tight and substantially nonporous. In other words, it is the provision of a multiplicity of furrows of capillary dimension in what is commonly a smooth cylindrical surface, that characterizes this invention, it being realized that the furrows of the roughly ridged and furrowed brick of my earlier invention may be of capillary character or not, depending upon the circumstances.

The furrows provided must be so slender as to exercise capillary attraction for excess moisture in the mortar, and actually lift such excess moisture from the mortar by reason of their capillary nature. It is impractical to specify dimensions, since whether a furrow is a capillary furrow or not is a matter of fact to be determined largely by experiment in the designing of any particular brick. The phenomenon is well known, as are also the conditions necessary to produce the phenomenon, and it is well within the skill of the art to produce the required capillary furrows in any given instance.

The furrows are provided in such number and extent as may be predetermined for any given instance to afford adequate moisture take-up capacity and retentivity to effectuate the desired end results, either in and of themselves, or in conjunction with whatever limited moisture take-up capacity is inherently afforded by the material of the brick itself.

It is a principal object of the present invention, then, to provide for the positive taking up of limited quantities of moisture from mortar in contact with the principal mortar-bonding surfaces of a building brick, immediately upon laying the brick, thereby largely preventing weeping or bleeding of the mortar and floating of the brick, and to provide, as well, for a relatively slow feeding of such moisture back into the mortar, as required, during the chemical setting of such mortar, and to do this without in any way detracting from the quality or usefulness of the brick or increasing to any significant extent the cost or ease of manufacture, the end results being greater ease and speed of laying, better and more durable bonding of mortar to bricks, and, on the whole, a stronger and better looking job than heretofore at lower labor cost.

Further objects and features of the invention will become apparent from the following detailed description of the preferred specific embodiment illustrated in the accompanying drawing by way of example.

Figure 2:
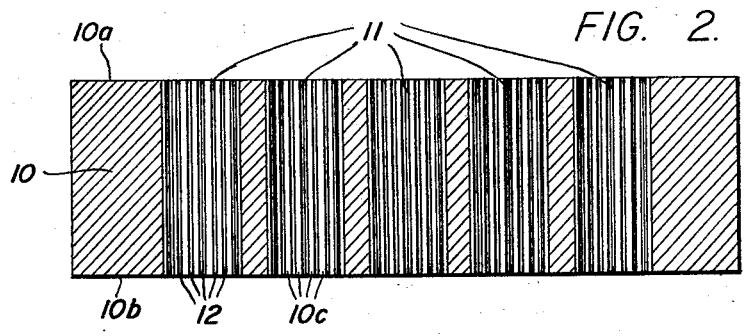

In the drawing:

Fig. 1 represents a perspective view of a cored building brick embodying the invention;

Fig. 2, a longitudinal section taken along the line 2—2 of Fig. 1; and

Figure 3:
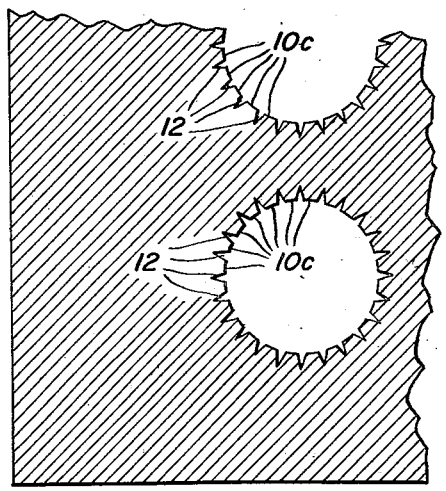

Fig. 3, a fragmentary horizontal section taken on the line 3—3 of Fig. 1 and drawn to an enlarged scale.

Referring now to the drawing:

Except for its embodiment of the capillary furrows of the present invention, the brick 10, Fig. 1, is typical of cored, masonry, building bricks commonly produced by brick manufactureres for use in building construction generally.

The respective cores 11 extend completely through the body of the brick from one of the principal bonding faces 10a to the opposite principal bonding face 10b.

Normally, the interior surfaces of the brick 10 which define the several cores 11 would be smoothly cylindrical without break in circumferential continuity. In accordance with the invention, however, as explained hereinbefore, such surfaces are provided with a multiplicity of slender and acutely tapered capillary furrows or grooves 12, which provide for rapid take-up of limited quantities of moisture from the mortar in which the brick is laid, and which, also, by their inherent character, release such moisture gradually during the mortar setting and curing stages.

As here illustrated, the capillary furrows or grooves 12 are of narrow V-formation. This is only one example of the possible cross sectional configuration of such furrows or grooves. The important thing is that they be capillary in character, rather than so wide in formation as to exhibit no capillary attraction for the moisture in the mortar against which the brick is laid and with which their open ends communicate.

It is possible, fo course, to provide furrows or grooves which are only partially capillary in character, and this is satisfactory so long as the aggregate effect of all is such as to provide the results described hereinbefore.

The capillary furrows or grooves may be formed in any suitable way, the preferred method being, however, to form them during the usual extrusion process by use of a suitable extrusion die core. In this manner, they are provided without adding to the normal time or cost of producing a brick of the general nature concerned.

It should be appreciated that the capillary action will be more pronounced and greater in volumetric capacity the deeper the furrows or grooves are, given, of course, a width which does not exceed capillary dimension.

As illustrated, the core-defining surfaces 10c of the brick, including the furrow or groove defining surfaces, are relatively skin-tight and non-porous as compared with the scarified core-defining surfaces of the brick of my aforementioned copending patent application. In certain instances, especially where the brick is inherently highly porous, this is an advantage, since there will be little or no tendency for the moisture take-up by capillary attraction to be largely dissipated within the body of the brick prior to the advanced setting and curing stages of the mortar. Nevertheless, an advantage gained by roughened furrow or groove defining surfaces is that the water appears to climb more readily therein, given, of course, capillary dimensions therefor.

It should be noted that a suction rate of 20 to 25 grams of water in one minute for a standard masonry brick has, under scientific test conditions, produced the highest bond strength with all types of mortar, see page 9 of "The Construction of Weather Resistant Masonry Walls," by L. A. Palmer, as published by Structural Clay Products, Inc., A. I. A. File Number 3–L, and that many modern manufacturers produce bricks having a considerably lower suction rate, see Report BMS82 of the National Bureau of Standards entitled "Building Materials and Structures," by Cyrus C. Fishburn, as issued April 15, 1942. Under such circumstances, the volumetric capacity of the capillary furrows or grooves should, in the aggregate, make up the difference in suction rate between that actually possessed by the particular brick concerned and that considered the most desirable for either all-around general use or for any given instance of use. In those instances of bricks where the suction rate is greater than the optimum and soaking before laying is resorted to, it should be realized that evaporation normally frees the capillary grooves of water before laying, and that they supply the limited moisture take-up capacity required for best results in practice.

A further advantage of the bricks of the invention is that they always stand ready, following curing of the mortar, to take-up moisture which might accidentally leak through the structure, thereby to a large extent safeguarding the interior of the structure against damage.

Whereas this invention is here illustrated and described in detail with respect to a particular preferred embodiment thereof, it is to be understood that other embodiments are possible within the scope of the claims which here follow, and that it is immaterial how many cores are provided in a given brick or whether the cores are cylindrical in formation or otherwise.

I claim:

1. A building brick having upper and lower mortar bonding faces with at least one core extending between and opening into said bonding faces, the surface of said core being provided with a plurality of parallel rectilinear furrows extending between and opening into said bonding faces at right angles thereto, each of said furrows being defined by a pair of surfaces which are sharply inclined toward each other and meet to form a narrow substantially V-shaped groove having capillary characteristics in order to remove excess moisture from mortar applied to said bonding faces.

2. The brick of claim 1, wherein the furrowed core-defining surfaces are largely skin-tight and non-porous.

3. In a building brick having upper and lower mortar bonding faces with at least one core extending between and opening into said bonding faces, the improvement which comprises a plurality of parallel rectilinear furrows extending between and opening into said bonding faces at right angles thereto, each of said furrows being defined by a pair of surfaces which are sharply inclined toward each other and meet to form a narrow substantially V-shaped groove having capillary characteristics in order to remove excess moisture from mortar applied to said bonding faces.

4. The brick of claim 3, wherein the furrowed core-defining surfaces are largely skin-tight and non-porous.

References Cited in the file of this patent

UNITED STATES PATENTS

| 989,677 | Wiederholdt | Apr. 18, 1911 |
| 2,022,928 | Stewart | Dec. 3, 1935 |
| 2,660,878 | Barnhart | Dec. 1, 1953 |

FOREIGN PATENTS

| 982,323 | France | 1951 |